United States Patent [19]

Strawczynski et al.

[11] Patent Number: 6,148,422
[45] Date of Patent: Nov. 14, 2000

[54] TELECOMMUNICATION NETWORK UTILIZING AN ERROR CONTROL PROTOCOL

[75] Inventors: Leo Strawczynski, Ottawa; Bill Gage, Stittsville; Rafi Rabipour, Côte St. Luc, all of Canada

[73] Assignee: Nortel Networks Limited, Montreal, Canada

[21] Appl. No.: 08/946,312

[22] Filed: Oct. 7, 1997

[51] Int. Cl.[7] .................................................. H04L 1/00
[52] U.S. Cl. .................................... 714/704; 714/807
[58] Field of Search ............................ 714/758, 807, 714/708, 704

[56] References Cited

U.S. PATENT DOCUMENTS

| | | |
|---|---|---|
| 4,184,118 | 1/1980 | Cannalte et al. .................... 325/183 |
| 5,121,396 | 6/1992 | Irvin et al. ............................ 371/53 |
| 5,365,525 | 11/1994 | Newberg et al. ..................... 371/2.1 |
| 5,438,326 | 8/1995 | Gorden et al. ................... 340/825.44 |
| 5,455,629 | 10/1995 | Sun et al. ............................. 348/466 |
| 5,517,510 | 5/1996 | Kuban et al. ....................... 371/37.1 |
| 5,550,543 | 8/1996 | Chen et al. ............................ 341/94 |
| 5,781,549 | 7/1998 | Dai ..................................... 370/398 |
| 5,796,785 | 8/1998 | Spiero ................................ 375/316 |
| 5,835,564 | 11/1998 | Chang et al. ........................... 379/1 |
| 5,864,542 | 1/1999 | Gupta et al. ........................ 370/257 |
| 5,898,695 | 4/1999 | Fujii et al. .......................... 370/464 |

*Primary Examiner*—Stephen M. Baker

[57] ABSTRACT

The present invention provides a system and a method for improving the voice quality of wireless-to-wireless calls. More specifically, the invention provides a method and an apparatus to add supplemental information for better error detection and correction of data packets. This feature allows the identification of the telecommunication link causing errors in the data packets and optimizes the use of the reconstructed data packets.

22 Claims, 11 Drawing Sheets

= RADIO CHANNELS INCLUDING FCC,
RCC, FVC AND RVC
MT = MOBILE TERMINAL
FWT = FIXED WIRELESS TERMINAL
BTS = BASE TRANSCEIVER STATION
LT = LAND TERMINAL
FCC = FORWARD CONTROL CHANNEL
RCC = REVERSE CONTROL CHANNEL
FVC = FORWARD VOICE CHANNEL
RVC = REVERSE VOICE CHANNEL

PRESENT FORMAT FOR DATA PACKETS TRAVELLING BETWEEN BASE STATIONS

EXAMPLE OF DATA PACKET FORMAT ON FORWARD VOICE CHANNEL (FROM BASE STATION TO WIRELESS TERMINAL) IN ACCORDANCE WITH INVENTION

FEC = FORWARD ERROR CORRECTION
W1 = WIRELESS NO. 1
W2 = WIRELESS NO. 2
BS1 = BASE STATION NO. 1
BS2 = BASE STATION NO. 2
S&C = SIGNAL & CONTROL
RFA = RF CHANNEL A
RFB = RF CHANNEL B

TELECOMMUNICATION NETWORK UTILIZING AN ERROR CONTROL PROTOCOL

FIELD OF THE INVENTION

The invention relates to the field of signal processing, particularly in the environment of a cellular communication network. More specifically, the invention relates to a method and to an apparatus to enable better error control and correction of data packets in a telecommunication network.

BACKGROUND OF THE INVENTION

In recent years, we have witnessed the proliferation of wireless voice telecommunication networks. Unfortunately, due to RF channel impairments and the use of speech compression techniques, voice quality in the wireless network is not as good as it is in the wireline network. There is therefore a thrust to provide better voice quality in wireless communications.

In wireless networks, channel bandwidth is at a premium. There is therefore an advantage in compressing voice signals in digital format by an apparatus called a vocoder. The name "vocoder" stems from the fact that its applications are specific to the encoding and decoding of voice signals primarily. Vocoders are usually integrated in mobile telephones and the base stations (or a link therefrom) of the telecommunication network. They provide compression of a digitized voice signal as well as the reverse transformation. The main advantage of compressing speech is that it uses less of the limited channel bandwidth for transmission. The main disadvantage is some loss of speech quality.

One method to obtain better voice quality is to use error detection and correction techniques on the data packets transported over the network. Many methods have been proposed to detect and correct errors in the data packets being sent over the telecommunication network. A general family of control techniques is called Forward Error Correction (FEC). In FEC, redundancy is included within the data frame, which permits the detection and correction of errors. No return path is necessary when using FEC. FEC can be further divided between "Convolutional Codes" and "Block Codes". All of these techniques can be used at certain locations in the network to provide error detection and correction.

Yet, another method of error control is to add, at the transmitter site, error flags to each data packet to indicate, to the receiver, the state of the data packet. Examples of those states include indications of frames in error, of reconstructed frames, of frames replaced by signaling data, etc.

OBJECTS AND STATEMENT OF THE INVENTION

An object of the invention is to provide a data processing apparatus, particularly well suited for use in a communication network capable of generating a data packet for transmission over a link of the communication network, the data packet including a status flag allowing to indicate if data contained in the data packet is in error.

Another object of the invention is to provide a method for processing a block of data bits for generating a data packet for transmission over a link of the communication network, the data packet including a status flag allowing to indicate if data contained in the data packet is in error.

Another object of the invention is to provide a wireless terminal capable of receiving audio data from a base station of a telecommunication network, the wireless terminal having a capability to recognize a data packet in error and also identify the location in the network at which the error in the data packet has occurred.

Another object of the invention is a method for processing audio information at a wireless terminal to recognize a data packet in error and also identify the location in the network at which the error in the data packet has occurred.

As embodied and broadly described herein, the invention provides a data processing apparatus, comprising:
an input for receiving a block of data bits;
analysis means for processing the block of data bits to determine if data conveyed by the block of data bits is in error;
data packet generation means for generating a data packet for transmission over a communication link, the data packet containing:
 a) an error-detecting code indicative of existence of an error in data contained in the data packet;
 b) a status flag for conveying information indicative of whether data conveyed by the data packet is in error;
said data packet assembly means being responsive to said analysis means when said analysis means detects an error in the block of data bits, for setting the status flag of the data packet at a value indicative of an existence of error.

In this specification, the terms "communication network" and "telecommunication network" are equivalent and are meant to include both analog and digital types of networks.

In this specification, the term "wireless terminal" is intended to include both mobile terminals and fixed wireless terminals.

The expression "wireless link" includes a communication path through which data is transported at least in part over an air interface, while "wireline link" designates a communication path in which data is exchanged primarily over a cable, such as a metal conductor or optical fiber.

The term "base station" in a communication network designated a fixed station enabling, through radio communication with a wireless terminal, to establish a link between the wireless terminal and the "backbone" network (also called landline network). Base stations are typically located at the center or on the edge of a coverage region (cell) and may include, among others, a base transceiver station (BTS), a base station controller (BSC), antennas, etc.

In this specification, the expression "data packet" will refer to a group of bits organized in a certain structure that conveys some information. In a specific example, a data packet, when representing a sample of compressed audio information, will usually include a user segment (containing the speech information), a signaling and control segment, an address segment, a header and a trailer segment, etc.

In this specification, the expression "data frame" or "frame" will refer to the part of the data packet that contains the user segment, in this case the speech information.

In this specification, the expression "error-detecting code" refers to a portion or the entire part of a data packet that allows to determine through processing if data associated with the error-detecting code is in error. The error detecting code may be separate from the data associated with it, such as a CRC code, or may be contained within the data itself. Thus, data encoded in a particular manner that enables through decoding to determine if the data has been corrupted, will be considered to contain an error-detecting code although here the code cannot be separated from the data. The expression error-detecting code will also refer to codes allowing error detection and reconstruction, such as FEC codes.

The expression "status flag" in the data packet will refer to an element of data such as a single bit or a group of bits that can acquire at least two discrete states, each state being indicative of an error condition status of at least a portion of the data in the data packet. In a specific example, the status flag is a single bit, 0 meaning that the data is in error, 1 meaning that the data is valid, or vice-versa.

In a preferred embodiment, the data processing apparatus broadly defined above is installed in a base station of the communication network and it is used for generating data packets for transmission toward the wireless terminal associated with this base station. The data processing apparatus receives a block of data bits that typically originates from another base station or another location in the network. This block of data bits contains user information, such as audio data, and may include a status bit to indicate whether the data is in error. Thus, if the status bit is set to a certain value, say "1", this means that the user information is not valid. Otherwise, the user information is valid. Typically, the status bit is set at the appropriate value by the base station or location from which the block of data bits is sent.

When the data processing apparatus receives the lock of data bits, it assembles the data into a data packet that typically includes, a preamble for synchronization, carrier recovery, a signaling and control section, a user information section etc. Typically, the user information section will include an error detection code, such as a CRC code designed to protect at least some of the important bits in the data packet. If the status bit is set at a value indicating that the user information is not valid, the base station will calculate the CRC code based on the user information received and it will also insert a status flag whose value is indicative as to whether the user information is valid. Thus, the data packet contains two elements that indicate the validity of the user information, one of those elements being the CRC code, the other element being the status flag. In a most preferred embodiment, the status flag is a single bit. The value 0 of this bit may indicate that the user information is valid while the value 1 indicates that the user information is in error.

When the wireless terminal receives the data packet, it will effect a verification of the data validity before attempting to build audio data from the user information. This verification stage has two steps. The first step is to check the CRC code. This is effected by calculating the CRC code on the bits protected by this code and comparing the result to the CRC code carried in the data packet. If a match is found, then the wireless terminal assumes that the transmission of the data packet from the last base station was correct and no error has occurred over the last RF link. The wireless terminal will then proceed to read the flag bit.

In a specific example, if the flag bit is a "1", this indicates that there is an error in the packet and that it is from a link previous to the last base station. The wireless terminal may then start counting the number of consecutive data packets in error. If the number is below a predetermined threshold, then the wireless terminal may replace the LP coefficients from the previous error free transmission and replace the frame energy value with an attenuated value. If the number is above a predetermined threshold, the wireless terminal may set the frame energy to "0" in order to mute the signal.

If, on the other hand, the flag bit is a "0", the wireless terminal will reset the counter and proceed to process the speech and signal and control data.

The last situation is if the CRC code in the data packet does not match the CRC code calculated for the user information. In this case, the wireless terminal then assumes that an error in the transmission from the last base station has occurred (i.e. on the last RF link). Again, in a specific example, the wireless terminal may then start counting (in the same counter as before) the number of consecutive data packets in error. If the number is below a predetermined threshold, then the wireless terminal may replace the LP coefficients from the previous error free transmission and replace the frame energy value with an attenuated value. If the number is above a predetermined threshold, the wireless terminal may set the frame energy to "0" in order to mute the signal.

The above description is for a specific example of the use of the information about which particular link is causing errors. Now that this information is available to the wireless terminal, many algorithms may be devised to enhance speech quality.

As embodied and broadly described herein, the invention also provides a wireless terminal capable of receiving audio information from a base station of a telecommunication network said wireless terminal including:

means for receiving a data packet transmitted from the base station of the telecommunication network;

error detection means for determining if data in the data packet is in error;

said error detection means including error location determining means for deriving information from data contained in the data packet transmitted from the base station on a location in the telecommunication network at which an error in data contained in the data packet has occurred.

DESCRIPTION OF A PREFERRED EMBODIMENT

Figure 1:
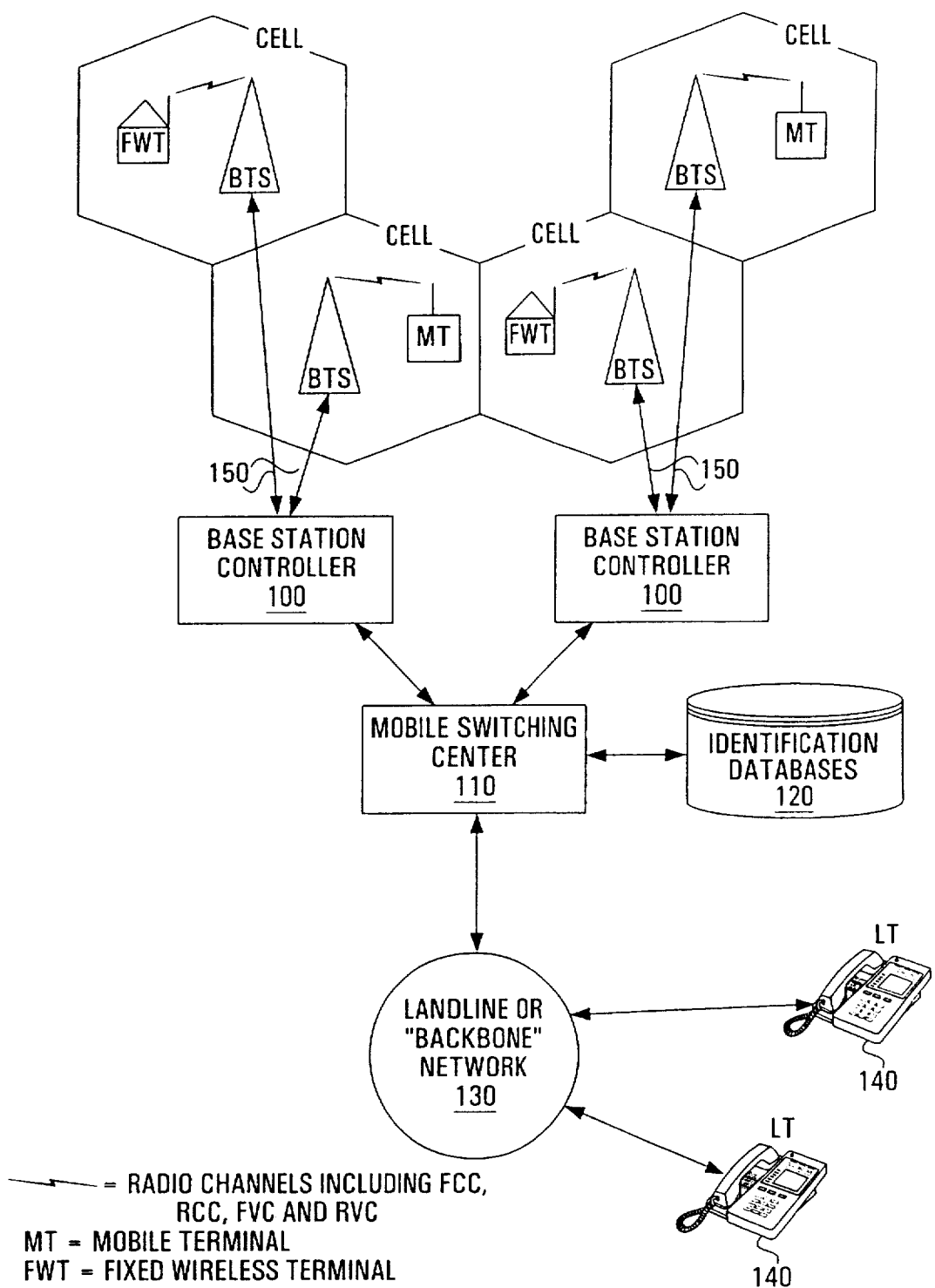
FIG. 1 is a block diagram representation of a portion of a cellular wireless telecommunication network.

FIG. 1 is a block diagram representation of a partial cellular wireless telecommunication network. The following paragraphs describe a possible design for a wireless telecommunication network. As a person versed in the art will notice, this example describes only one of many possible wireless network configurations. Wireless networks often differ in their components, in the components interaction with each other and in the terms used to describe elements of the network.

In this figure, Mobile Terminals (MT) are on the move in the hexagonal areas defined as cells. Fixed wireless terminals (FWT) are also included in the areas defined as cells. Each cell covers a predetermined geographical area and has a Base Transceiver Station (BTS) which communicates through radio channels with the MTs and FWTs. Typically, these channels are in the 900 MHz, 1.8 GHz or 1.9 GHz ranges. A number of BTSs (i.e. cells) are connected by land line or microwave link 150 to one Base Station Controller 100 (BSC) that controls handoff functions and routes the signal as requested. A number of BSCs are in turn connected to a Mobile Switching Center 110 (MSC). The MSC coordinates the activities of all its BSCs, verifies/acknowledges MT information through its identification database 120 and provides a connection to the Public Switched Telephone Network 130 (PSTN). Land terminals 140 (LT) are also shown for completeness. Note that the PSTN and LTs are not part of the cellular wireless communication network.

When a call is made to or from a wireless terminal (MT or FWT), four radio channels are involved in each of the links between a wireless terminal and a BTS. The channel used to communicate voice data from the BSC to the wireless terminal is called the Forward Voice Channel (FVC). The channel used to communicate voice data from the wireless terminal to the BSC is called the Reverse Voice Channel (RVC). Two other channels carry the handshaking information required to establish communications with wireless terminals. They are the Forward Control Channel (FCC) and the Reverse Control Channel (RCC). Among other things, the FCC and RCC are used to broadcast the mobile identification number (MIN) (i.e. the wireless terminal's telephone number).

When a wireless terminal is first turned on, without it being involved in a call, it scans the FCCs to determine which one has the strongest signal. It then monitors the chosen FCC until the signal drops below a usable level. The process of finding a FCC and monitoring it is then repeated. When a communication is established from a wireless terminal, a call initiation request is sent on the RCC. With this request the wireless terminal transmits its MIN, electronic serial number (ESN) and the telephone number of the called party. The wireless terminal also transmits a station class mark (SCM) which indicates the maximum transmitter power level for that particular user. The BTS receives this data and sends it to the MSC via the BSC.

For a call to a wireline terminal, the MSC validates the request, makes the connection to the called party through the PSTN, and instructs the BTS and wireless terminal to use a selected FVC and RVC pair to allow the conversation to begin.

For a call to another wireless terminal, the MIN of the called party is broadcast as a paging message over all of the FCCs throughout the cellular system. The called wireless terminal receives the paging message sent by its BTS, which it monitors, and responds by identifying itself over the RCC. The BTS relays the acknowledgement sent by the wireless terminal, and informs the MSC of the handshake. Then, each MSC involved instructs the BTSs to use a free FVC and RVC pair. At this point, another data message (called an alert) is transmitted over the FCC to instruct the wireless terminal to ring.

Once a call is in progress, the MSC adjusts the transmitted power of the wireless terminal and changes the channels involved in order to maintain call quality as the subscriber moves in and out of range of each BTS. Signal and control information is included in the voice channels so that the wireless terminal may be controlled by the BTS and MSC while a call is in progress.

Figure 2A:
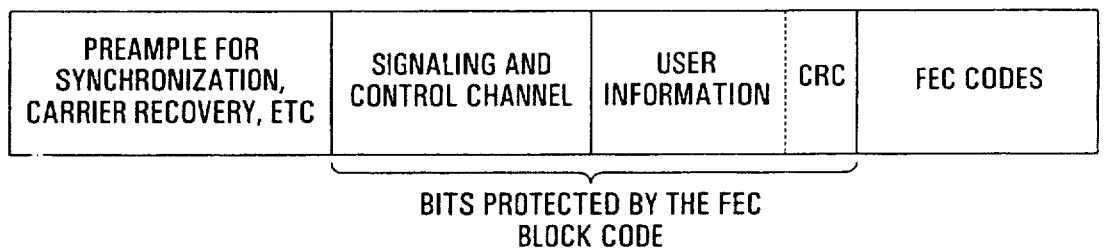
FIG. 2a is an example of a format for a data packet protected by a FEC block code and transported on the Forward and Reverse Voice Channels in present telecommunication networks.
Figure 2B:
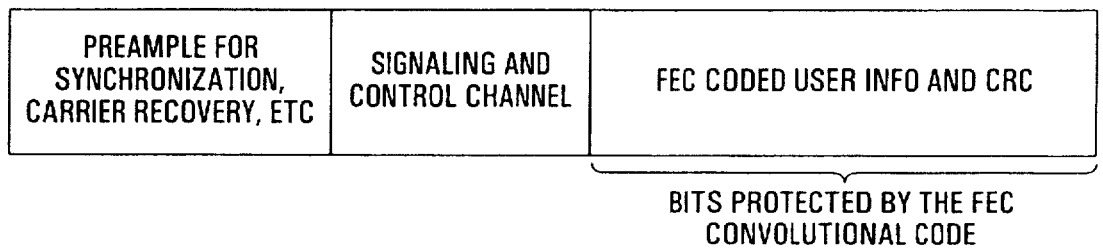
FIG. 2b is an example of a format for a data packet protected by a FEC convolutional code and transported on the Forward and Reverse Voice Channels in present telecommunication networks.
Figure 2C:
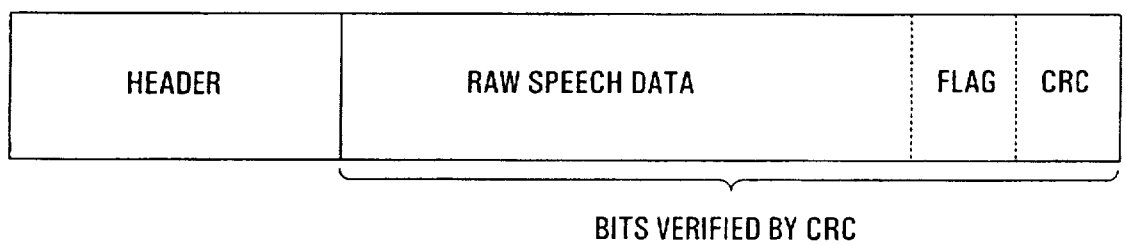
FIG. 2c is an example of a format for a data packet transported between Base stations in present telecommunication networks.

Methods developed to improve transmission of speech data over the telecommunication network described above include error control schemes. A general family of control techniques is called Forward Error Correction (FEC). In FEC, redundancy is included within the data frame, which permits the detection and correction of errors. No return path is necessary when using FEC. Referring back to FIG. 1, before a speech signal is transmitted from a wireless terminal to a BS and vice versa over a RF channel (i.e. FVC or RVC), it needs to be assembled in packets. Examples of two formats for such a data packet are given at FIGS. 2a and 2b. Preamble information (for synchronization, carrier recovery, etc.), signaling and control information and FEC codes are appended to the user information. When using block codes, the FEC codes may protect both the signal and control, and the user information. In some present systems using convolutional codes, only the user information, the flag, and the CRC are protected by the FEC. For data packets travelling between base stations, the format is depicted at FIG. 2c.

Figure 3A:
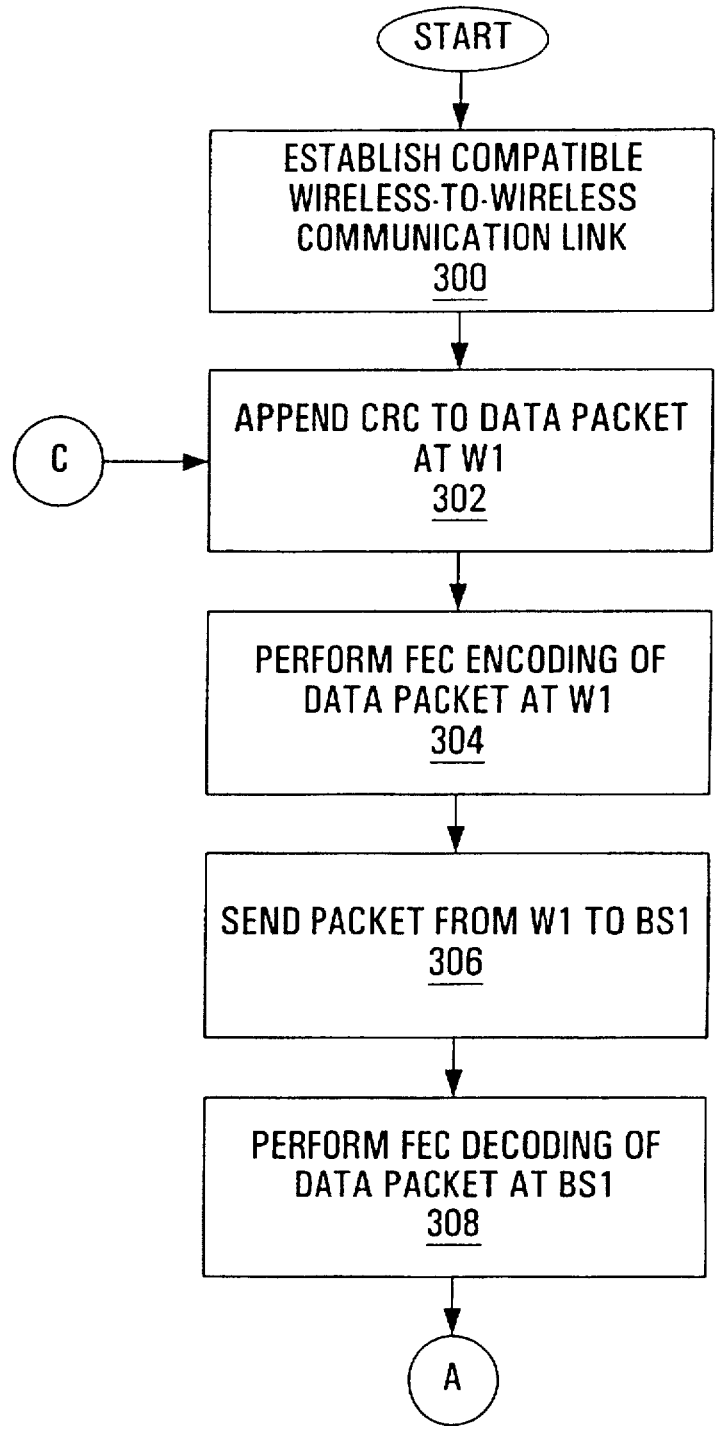
FIGS. 3a, 3b and 3c show is a flowchart for the processing of data packets in present telecommunication networks.
Figure 3B:
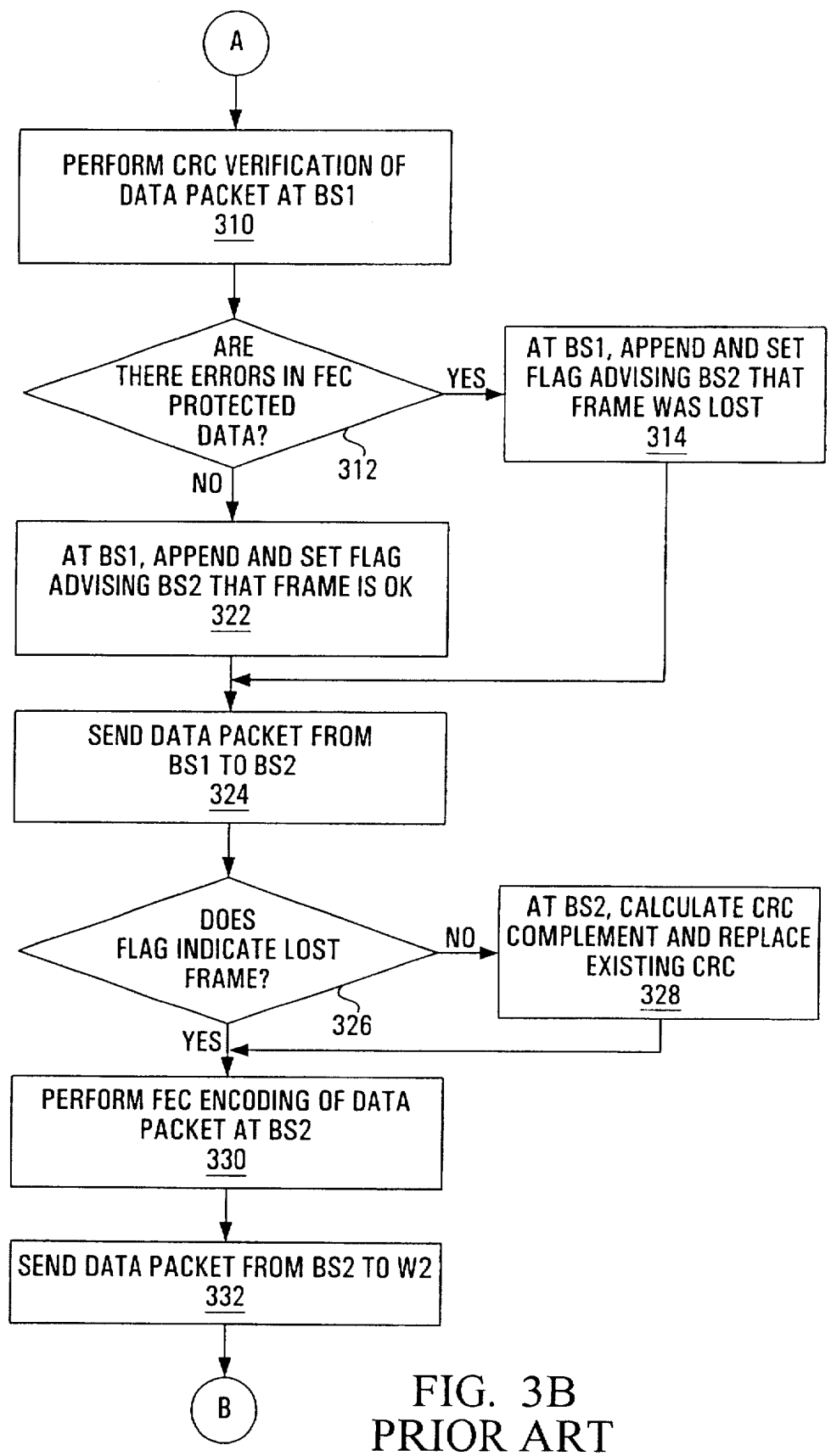
Figure 3C:
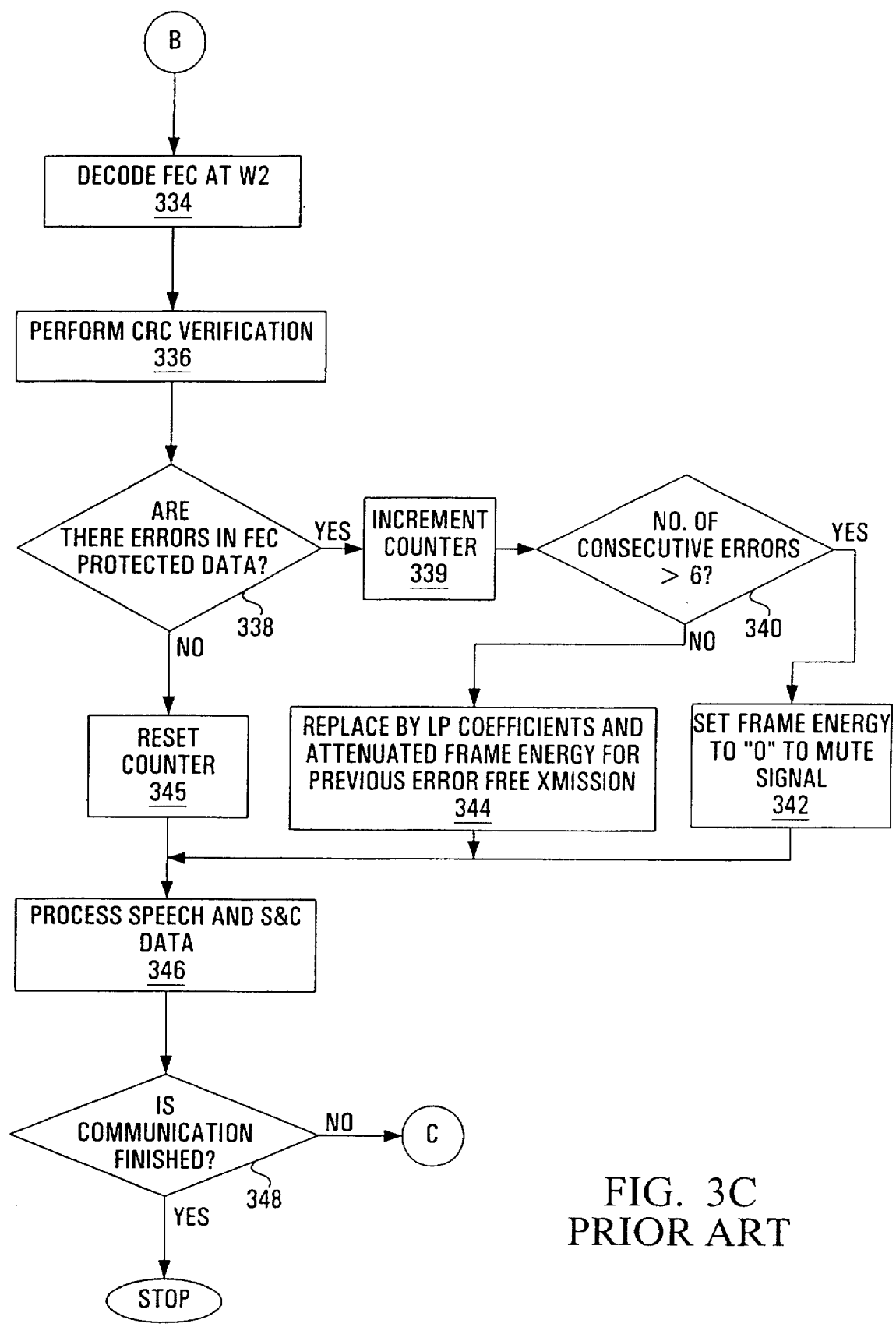

In present systems, the data packets, which include speech frames, travel their path as described earlier with FIG. 1. FIGS. 3a, 3b and 3c give an example of the movement, in a present system, of a data packet through the communication network when a call is made between two compatible wireless terminals. At step 300, a communication link is established between the compatible wireless terminals. At step 302, CRC is calculated and appended to the data packets and at step 304, a FEC encoder encodes the user and the signal and control information and the FEC coded data is placed into the data packet. These last two steps are executed at the first wireless terminal. The data packet is then sent from the first wireless terminal to its base station (step 306). The first base station then performs FEC decoding of the data packet (step 308) and CRC verification of the same data (step 310). An example of CRC verification would simply be to recalculate the CRC and compare it to the received CRC. If they do not match then the received data is declared to be in error. The first base station then determines whether there are errors in the FEC protected data (step 312). If there are errors in the data, a flag is set to advise the second base station that the frame was lost over RF channel A (step 314). If there were no errors in the protected data, the flag is set, at step 322, in such a manner as to advise the second base station that the frame is valid. The communication network proceeds to send the data packet from the first base station to the second base station at step 324. At the second base station, the flag is read at step 326, and if it indicates a lost frame, the CRC complement is calculated and replaces the existing CRC (step 328). This last step will force the second wireless terminal to see an error on the data frame and thus ensure that the second wireless terminal will know that the frame was lost. It will not know, however, if the frame was lost over RF channel A or RF channel B.

In the Nortel patent application for "bypass" referred to earlier, there are provisions for the interpretation of Cyclic Redundancy Checks (CRC) on the data packets transported between wireless terminal possessing compatible vocoders. The CRCs indicate that the speech frame is corrupted due to earlier sections of the connection. The error detection capabilities of the CRCs are, however, not optimal. In fact, some terminals may misinterpret the error pattern as an indication that the current radio link is poor while, in fact, an earlier section is causing the errors. Simply adding CRC can also lead to spurious and unnecessary requests for RF channel reassignment and/or hand-off. The approach is fully described in the international application serial number PCT/95CA/00704 dated Dec. 13, 1995. The contents of this disclosure are incorporated herein by reference.

Returning to step 330 of FIG. 3b, the second base station performs FEC encoding of the data packet and forwards the data packet from the second base station to the second wireless terminal at step 332. The data packet is first FEC decoded at the second wireless terminal (step 334). The next step is to perform the CRC verification at step 336 in order to determine if there are errors in the FEC protected data (step 338).

Once it has been established that a data packet is in error, the system carries out its speech-processing algorithm as detailed in the applicable telecommunication standard. In this example, the telecommunication standard is TIA TR 54.3 IS-54. In this case, the system will increment a counter (step 339) and then determine from it whether the number of consecutive errors is smaller or greater than six (step 340). If it is greater than 6, the frame energy is set to 0 for this data packet in order to mute the signal (step 342). If the number of consecutive errors is less than 6, the linear prediction coefficients are replaced by the coefficients from the previous error free transmission and the frame energy is replaced by the attenuated frame energy of the previous error free transmission (step 344). The next step (346) is to process the speech and the signal and control data in order for the second wireless terminal to produce audible sounds.

If no errors are detected (step 338), the counter is reset (step 345) and the speech and the signal and control data are processed at step 346.

Finally, at step 348, the system verifies if the communication is finished. If it is, the process is stopped and if it is not, the system returns to step 302 to get the next data packet.

This invention proposes to provide supplemental information for error detection and correction of speech frames, namely, to insert flag data in order to identify which link is causing the errors in the speech frames and optimize the use of the reconstructed speech frames.

Figure 2D:
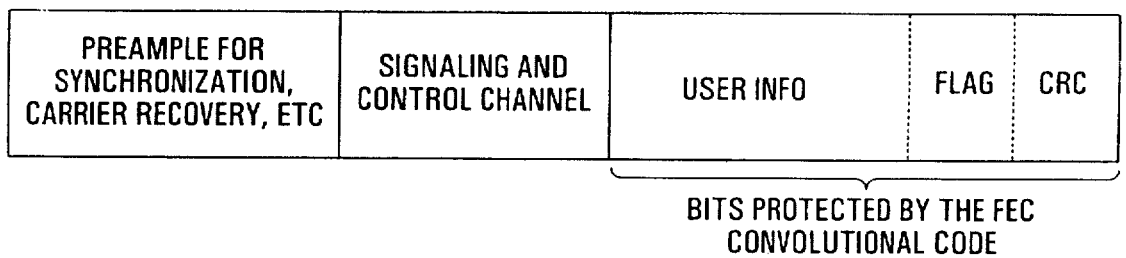
FIG. 2d is an example of a format for a data packet protected by a FEC convolutional code and transported on the Forward Voice Channel in the telecommunication network designed in accordance with the invention.

An example of a data packet format that will be used on the forward voice channel (from a base station to a wireless terminal) and resulting from the supplemental error coding procedures is shown at FIG. 2d. The data packet format therefore remains the same from the first wireless terminal to the second base station (i.e. on the RVC). The main difference between the data packets in FIG. 2b and FIG. 2d is the flag information introduced in the bits protected by the FEC convolutional code.

The function of the flag information inserted into the data packet is to indicate the status of the data frame. A number of different arrangements can be used to insert the flag information into the RF Channel structure. An example of one method is to add one bit to the bits protected by the FEC convolutional code (as per FIG. 2d) to be interpreted as follows:

a) "0" indicates that the data frame is valid, and
b) "1" indicates that the data frame is in error.

The second wireless terminal will use these flag bits to determine which link is causing the errors and with this new information carry out the best reconstruction algorithm.

Figure 4A:
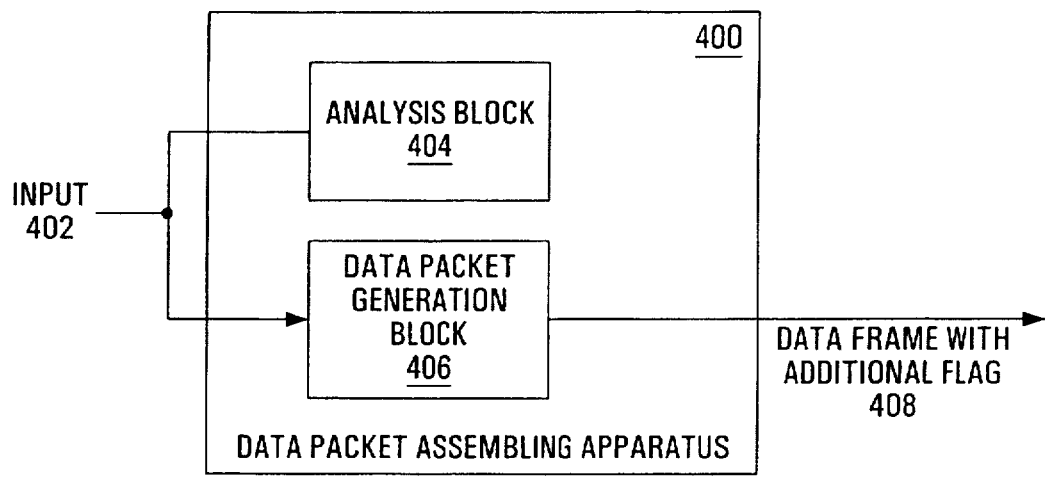
FIG. 4a is a block diagram of an apparatus for modifying data packets for implementing a part of the method proposed at FIG. 5.
Figure 4B:
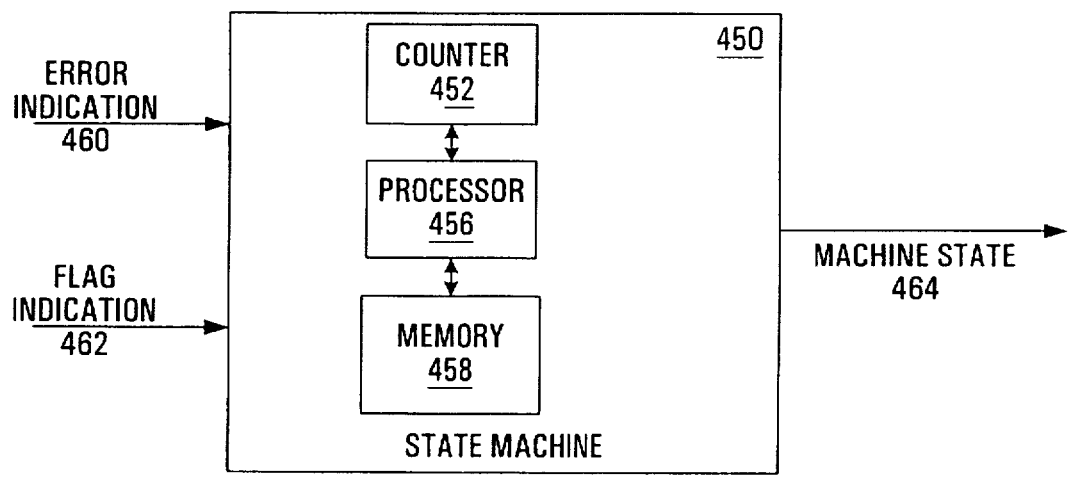
FIG. 4b is a block diagram of a state machine for implementing a part of the method proposed at FIG. 5.
Figure 5A:
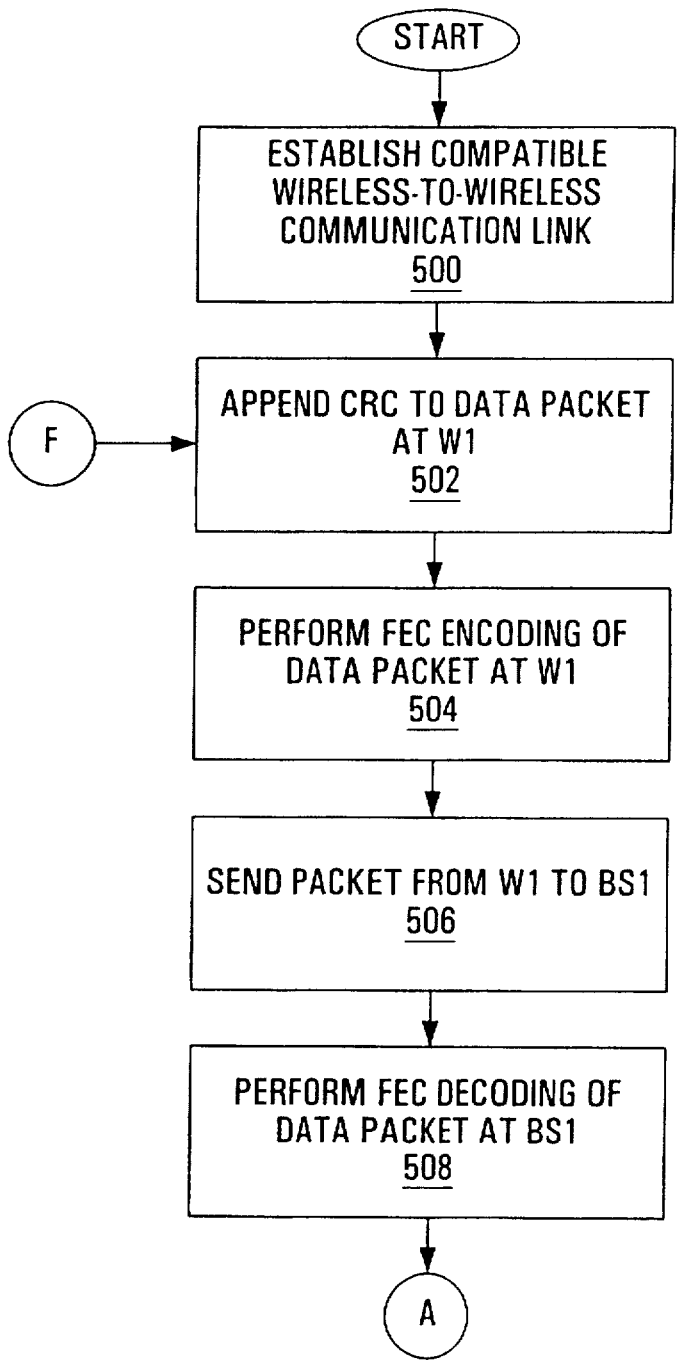
FIGS. 5a, 5b, 5c and 5d is a flowchart of the proposed method for processing data packets.
Figure 5B:
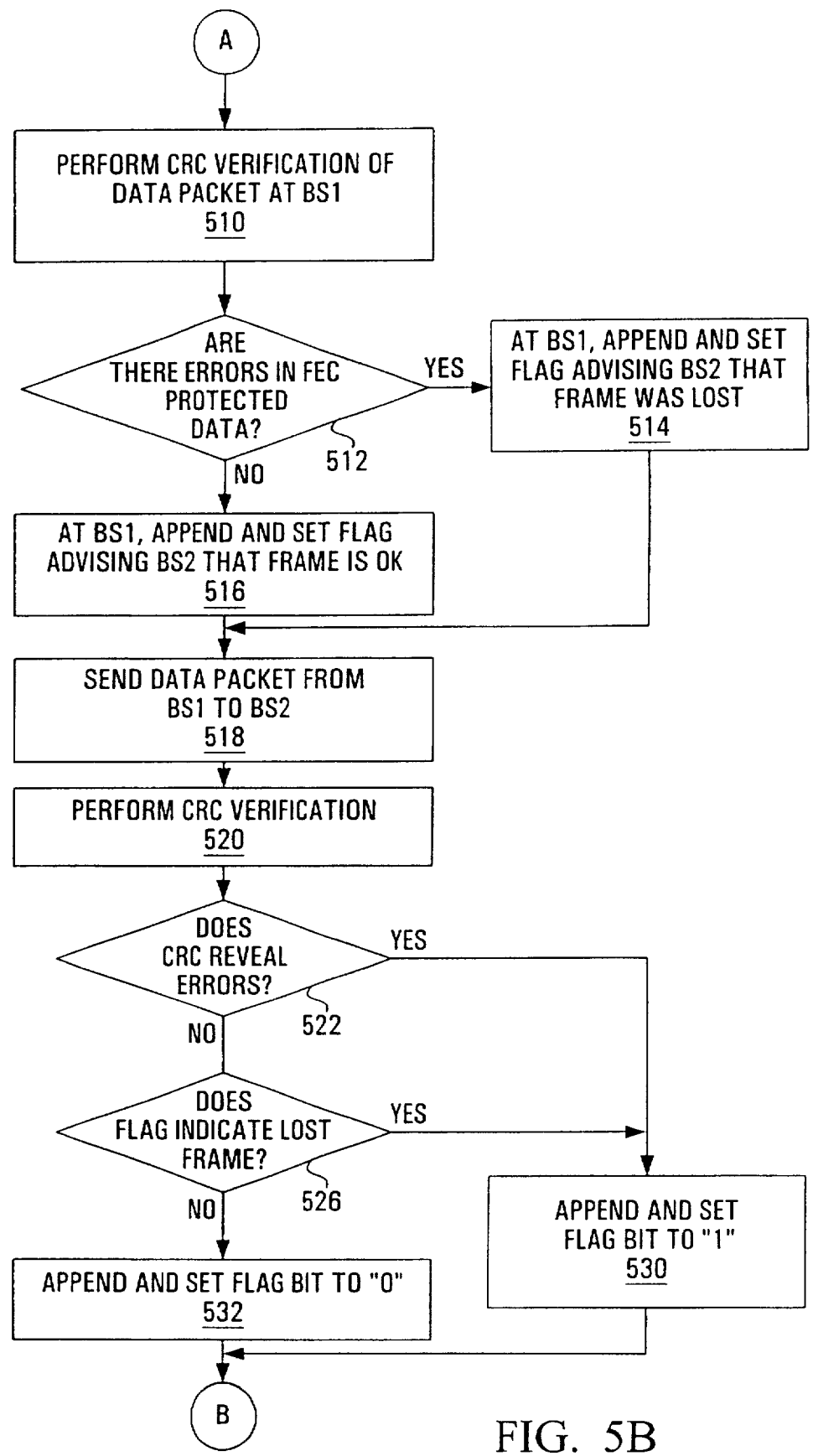
Figure 5C:
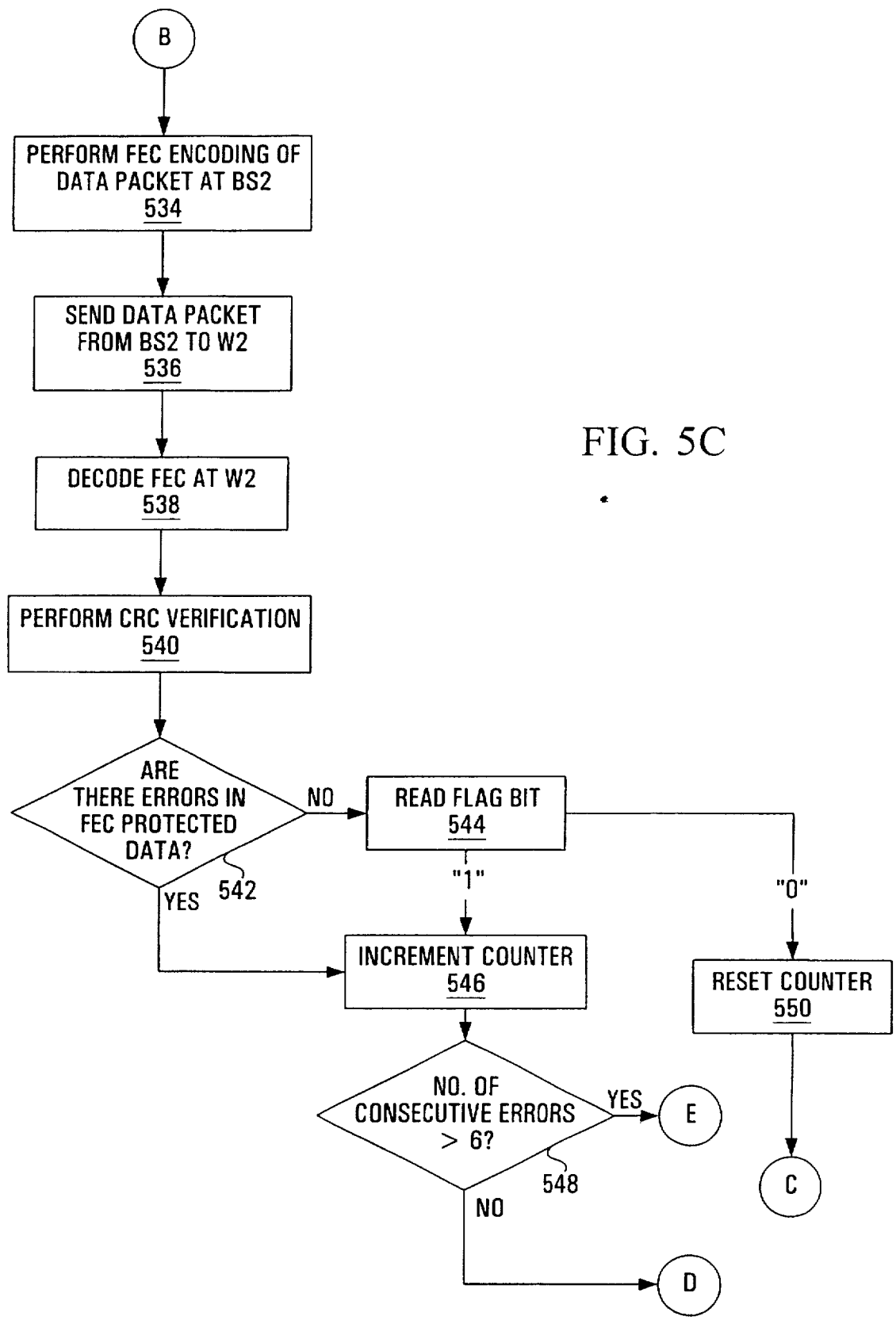
Figure 5D:
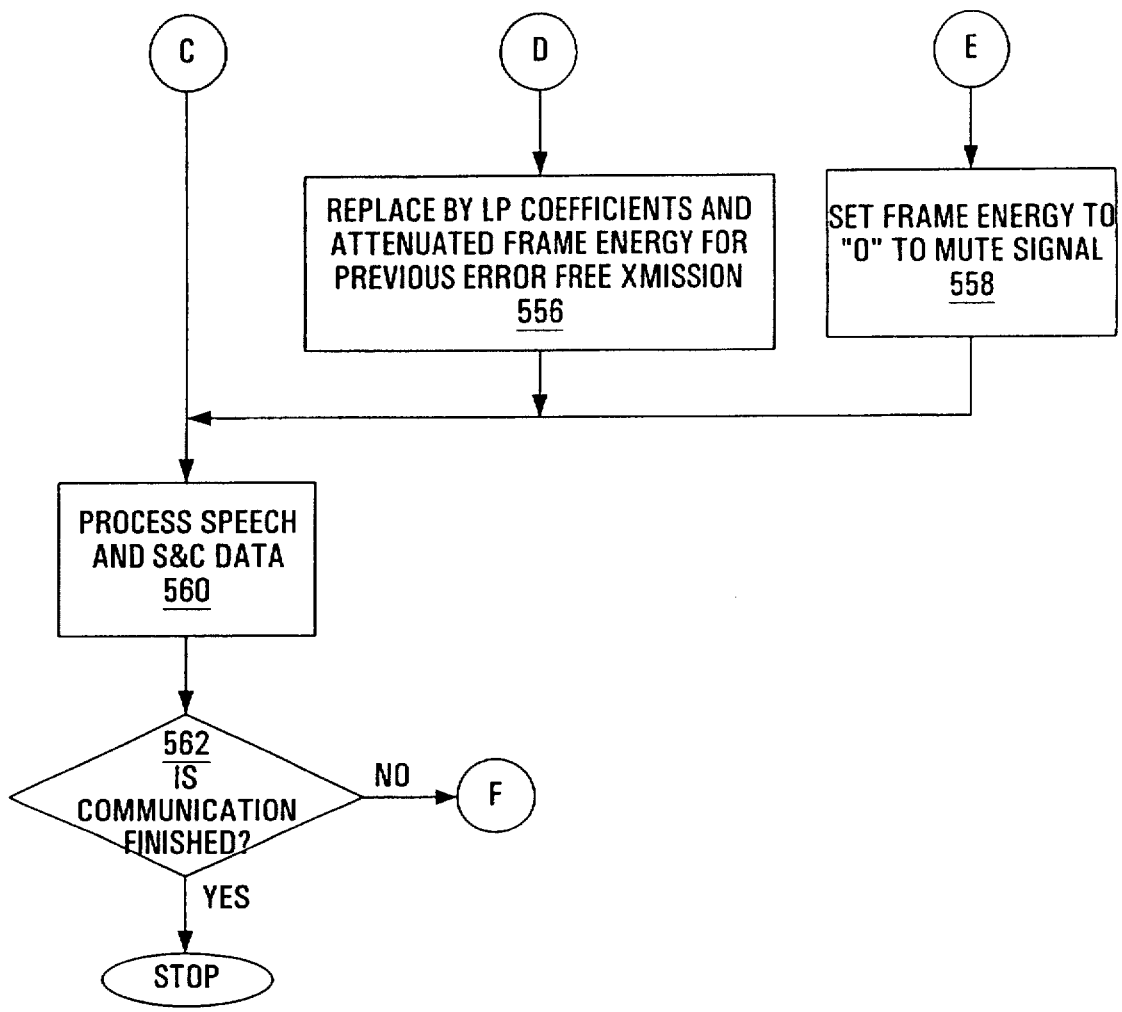

FIGS. 4A and 4B illustrate block diagrams of devices required in order to implement the invention detailed in the flow diagram at FIGS. 5a, 5b, 5c and 5d.

FIG. 4a is a block diagram of a data processing apparatus 400 for assembling data packets for transmission toward a wireless terminal. Typically, the data processing apparatus 400 would be installed in a base station of the network. Generally speaking, the apparatus is designed to receive the block of data bits from a base station, as per the format shown in FIG. 2c, and re-format this data according to a format suitable for transmission over an RF link toward a wireless terminal. During this operation, the apparatus 400 will insert in the data packet a status flag, in the form of a single bit, to indicate if the user information is valid or not. The apparatus 400 is comprised of input 402 for receiving the block of data bits according to the format of FIG. 2c. An analysis block 404 reads the status bit in the data from the first base station. A data packet generation block 406 effects the data packet construction. In dependence upon the output of the analysis block 404, the data packet generation block will set the value of the status flag to indicate if the data is valid or not. The data packet for transmission over the RF link is issued through an output 408. The apparatus 400 may be implemented on a suitable computer that would include a processor and a memory for storage of instructions for the operation of the processor. Alternatively, the operational logic of the apparatus 400 may be hardwired onto an integrated circuit. The detailed steps of the operation of the apparatus 400 are depicted in FIGS. 5a, 5b, 5c and 5d and will be described in detail later.

FIG. 4b is a block diagram of a state machine incorporating steps 542 to 550 that would be installed in wireless terminals and that would determine from which RF channel the errors are coming and the best action to take to reconstruct the data packet. The state machine 450 is comprised of a processor 456, a memory 458 and two counters 452 and 454. The memory 458 is used for storing instructions for the operation of the processor 456 and for storing the data used by the processor 456 in executing those instructions. The counter is required in this particular example in order to determine the number of consecutive packets in error. An error indication input 460 and a flag indication input 462 are required. The output is the machine state 464 that, in this example, can take on values to cover three situations. For this example these situations are: 1- to replace the present data packet by LP coefficients and attenuated frame energy for the previous error free transmission, 2- to set frame energy to "0" in order to mute the signal, and 3- to go directly to step 560 (process speech and signal and control data) without modifying the data packet.

The flowchart in FIGS. 5a, 5b, 5c and 5d illustrates an example of a data packet transmission from one wireless terminal to another wireless terminal, incorporating the principles of the invention.

At step 500, a communication link is established between the compatible wireless terminals. At step 502, CRC is calculated and appended to the data packets and at step 504, a FEC encoder encodes the user, the signal and control information and the FEC coded data is placed into the data packet. These last two steps are executed at the first wireless terminal. The data packet is then sent from the first wireless terminal to its base station (step 506). The first base station then performs FEC decoding of the data packet (step 508) and CRC verification of the same data (step 510). The first base station then determines whether there are errors in the FEC protected data (step 512). If there are errors in the data, a flag is set to advise the second base station that the frame was lost over RF channel A (step 514). If there were no errors in the protected data, the flag is set, at step 516, in such a manner as to advise the second base station that the packet is valid. The communication network proceeds to send the data packet from the first base station to the second base station at step 518. At the second base station, a CRC verification is performed (step 520) and if the CRC reveals errors in the data stream (step 522), a new flag is set to "1" and appended to the data packet (step 530). If the CRC does not reveal errors in the data stream (step 522), the flag is read at step 526, and if it indicates a lost frame, once again, a new flag is set to "1" and appended to the data packet (step 530). If the flag indicates at step 526 that the frame was not lost, a new flag is set to "0" and appended to the data packet (step 532). At this point, the new flag bit indicates if there is an error in the speech frame from a previous link or not.

The second base station performs FEC encoding of the data packet (step 534) and forwards the data packet from the second base station to the second wireless terminal at step 536. The data packet is first FEC decoded at the second wireless terminal (step 538). The next step is to perform the CRC verification at step 540 in order to determine if there are errors in the FEC protected data (step 542).

If it is established that a data packet is not in error, the system will read the flag bit (step 544) to determine a speech processing algorithm as prescribed by the applicable telecommunication standard. An example of a telecommunication standard is TIA TR 54.3 IS-54. In the specific case, if the flag indication is a "1", (indicating that the error is previous to RF channel B) the counter will be incremented by 1 (step 546). If the flag indication is a "0", (indicating that the packet is error-free) the counter will be reset to 0 (step 550) and the algorithm will proceed directly to step 560 to process the speech and the signal and control data in order for the second wireless terminal to produce audible sounds.

If it is established at step 544 that the data packet is in error (indicating that the error is from RF channel B), the counter will be incremented by 1 (step 546). The system will then determine whether the number of consecutive frames in error is smaller or greater than six (step 548). If it is greater than 6 on one of the channels, the frame energy is set to 0 for this data packet in order to mute the signal (step 558). If the number of consecutive errors is less than 6 on one of the channels, the linear prediction coefficients are replaced by the coefficients from the previous error free transmission and the frame energy is replaced by the attenuated frame energy of the previous error free transmission (step 556).

In this case, the algorithm is improved since the counter will reach its threshold sooner especially in the case of overlapping errors from RF link B and errors from previous links. In the case of IS-54, it will set the frame energy to "0" sooner. In the case of other telecommunication standards, the fact that the system can establish which link is causing the error can be used differently to enhance speech quality.

The next step (560) is to process the speech and the signal and control data in order for the second wireless terminal to produce audible sounds. Finally, at step 562, the system verifies if the communication is finished. If it is, the process is stopped and if it is not, the system returns to step 502 to get the next data packet.

The supplemental error coding methods and apparatuses proposed in this invention will enable the identification of the faulty transmission link(s) (radio and/or land) and/or faulty speech compression, and permit proper adjustment of the system components and/or speech processing in order to improve voice quality.

The above description of a preferred embodiment should not be interpreted in any limiting manner since variations and refinements can be made without departing from the spirit of the invention. The scope of the invention is defined in the appended claims and their equivalents.

We claim:

1. A wireless terminal capable of receiving audio information from a base station of a telecommunication network said wireless terminal including:

means for receiving a data packet transmitted from the base station of the telecommunications network;

error detection means for determining if data in the data packet is in error;

said error detection means including error location determining means for deriving information from data contained in the data packet transmitted from the base station on a location in the telecommunication network at which an error in data contained in the data packet has occurred.

2. A wireless terminal as defined in claim 1, wherein said error detection means comprises means for decoding an error-detection code.

3. A wireless terminal as defined in claim 1, wherein said error detection code is CRC.

4. A wireless terminal as defined in claim 3, wherein said error location determining means includes means for observing a state of a status flag in the data frame transmitted from the base station, the status flag being discrete from the error-detection code.

5. A wireless terminal as defined in claim 4, wherein said error location determining means is capable of determining if an error observed by said error detection means has occurred in either one of a link established between the base station and said wireless terminal and a remaining part of the telecommunication network.

6. A wireless terminal as defined in claim 4, comprising a counter for counting a number of successive data packets containing data in error.

7. A wireless terminal as defined in claim 6, wherein said counter is responsive to observance of an error condition indicative by said status flag to cause the counter to increment.

8. A wireless terminal as defined in claim 7, wherein said counter is responsive to observance of an error condition indicative by said error detection code to cause the counter to increment.

9. A wireless terminal as defined in claim 8, wherein said counter is responsive to observance to a status flag indicative of a non-error condition to cause said counter to reset.

10. A wireless terminal as defined in claim 9, comprising a data packet processing means, said data packet processing means processing a data packet in dependence upon a value of said counter.

11. A wireless terminal capable of receiving audio information from a base station of a telecommunication network said wireless terminal including:

a unit for receiving a data packet transmitted from the base station of the telecommunications network;

an error detection unit for determining if data in the data packet is in error, said error detection unit including an error location determination sub-unit for processing the data packet transmitted from the base station for deriving information on a location in the telecommunication network at which an error in the data contained in the data packet has occurred.

12. A method for receiving audio information from a base station of a telecommunication network said method including:

receiving a data packet transmitted from the base station of the telecommunication network;

determining if data in the data packet is in error including processing the data packet transmitted from the base station for deriving information on a location in the telecommunication network at which an error in the data contained in the data packet has occurred.

13. A data processing apparatus, comprising:

an input for receiving a block of data bits;

analysis unit for processing the block of data bits to determine if data conveyed by the block of data bits is in error;

data pocket assembly unit for generating a data packet for transmission over a communication link, the data packet containing:

a) the block of data bits;

b) an error-detecting code indicative of existence of an error in data contained in the data packet;

c) a status flag for conveying information indicative of whether data conveyed by the data packet is in error;

d) an information data element indicative of the location at which the error in said data packet originates, if said data packet is in fact in error;

said data packet assembly unit being responsive to said analysis unit when said analysis unit detects an error in the block of data bits, for setting the status flag of the data packet at a value indicative of an existence of error.

14. A data processing apparatus as defined in claim 13, wherein said data packet assembly unit is responsive to said analysis unit when said analysis unit means detects no error in the block of data bits for setting said error-detecting code to a value indicative of an non-error condition.

15. A data processing apparatus as defined in claim 13, wherein said block of data bits contains an earlier status flag conveying information indicative of whether the data conveyed by the data bits is in error.

16. A data processing apparatus as defined in claim 15, wherein said information is composed of the status flag and of the earlier status flag.

17. A data processing apparatus as defined in claim 13, wherein said error-detecting code is a CRC code.

18. A data processing apparatus as defined in claim 17, wherein said data packet assembly unit includes endoding means for encoding data bits in accordance with an FEC protocol.

19. A data processing apparatus as defined in claim 18, wherein the data bits encoded by said encoding means include the CRC code.

20. A data processing apparatus as defined in claim 19, wherein the data bits encoded by said encoding means include the status flag.

21. A data processing apparatus as defined in claim 17, wherein the status flag includes a single bit.

22. A computer readable storage medium comprising a program element suitable for execution by a computing apparatus for:

processing a block of data bits to determine if data conveyed by the block of data bits is in error;

generating a data packet for transmission over a communication link, the data packet containing:

a) the block of data bits;

b) an error-detecting code indicative of existence of an error in data contained in the data packet;

c) a status flag for conveying information indicative of whether data conveyed by the data packet is in error;

d) an information data element indicative of the location at which the error in said data packet originates, if said data packet is in fact in error;

said generating responsive to said processing when said processing detects an error in the block of data bits, for setting the status flag of the data packet at a value indicative of an existence of error.

* * * * *